United States Patent
Arcese

(10) Patent No.: US 8,756,569 B2
(45) Date of Patent: Jun. 17, 2014

(54) DETERMINISTIC PSEUDO-RANDOM FAULT EVENT RECORDATION AND INJECTION TOOL

(75) Inventor: Mauro Arcese, Fontana Liri (IT)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 12/203,294

(22) Filed: Sep. 3, 2008

(65) Prior Publication Data

US 2009/0158259 A1 Jun. 18, 2009

(30) Foreign Application Priority Data

Dec. 17, 2007 (EP) .................................. 07123376

(51) Int. Cl.
*G06F 9/44* (2006.01)
*G06F 11/36* (2006.01)

(52) U.S. Cl.
CPC .................................. *G06F 11/3688* (2013.01)
USPC ............................ 717/124; 717/130; 717/131

(58) Field of Classification Search
USPC .......................................... 717/124, 130–131
See application file for complete search history.

(56) References Cited

U.S. PATENT DOCUMENTS

| | | | |
|---|---|---|---|
| 6,477,666 B1* | 11/2002 | Sanchez et al. ................. | 714/41 |
| 6,854,108 B1 | 2/2005 | Choi | |
| 6,971,048 B1 | 11/2005 | Hanson et al. | |
| 2004/0194107 A1* | 9/2004 | Masuoka ...................... | 718/100 |
| 2004/0243882 A1* | 12/2004 | Zhou ............................... | 714/38 |
| 2006/0143540 A1* | 6/2006 | Burk ............................... | 714/41 |
| 2006/0271825 A1* | 11/2006 | Keaffaber et al. .............. | 714/38 |

OTHER PUBLICATIONS

Engblom, "Testing Embedded Software Using Simulated Hardware," http://www.engbloms.se/publications/engblom-erts2006.pdf.
Vinter et al., "An Overview of GOOFI—A Generic Object-Oriented Fault Injection Framework," http://www.ce.chalmers.se/~rbarbosa/TechnicalReport_AnOverviewOfGOOFI.pdf.
Spiteri, "An Architecture for the Notification, Storage and Retrieval of Events," http://citeseer.ist.psu.edu/cache/papers/cs2/446/http:zSzzSzwww-Ice.eng.cam.ac.ukzSzIce-pubzSzpubliczSzfileszSzSpiteri2000.pdf/spiteri00architecture.pdf.
Steven, "jRapture: A Capture/Replay Tool for Observation-Based Testing," ACM SIGSOFT Software Engineering Notes archive, Sep. 2000, pp. 158-167, vol. 25, Issue 5, ACM Press.

\* cited by examiner

*Primary Examiner* — Li B Zhen
*Assistant Examiner* — Duy Khuong Nguyen
(74) *Attorney, Agent, or Firm* — Nelson and Nelson; Daniel P. Nelson; Alexis V. Nelson

(57) ABSTRACT

A method is presented for recording and injecting a fault event during execution of a computer program. The method may include detecting a method call event during execution of the program, incrementing a counter to produce a counter value, and determining, based on a program execution state, a fault event to be generated. The fault event may be associated with a fault event type. The fault event type and the counter value may be stored, and the fault event may be generated. A second method call event may be detected during execution of the program and a second counter may be incremented, producing a second counter value. A previously-generated fault event associated with a counter value matching the second counter value may be identified, and the previously-generated fault event may be generated.

16 Claims, 5 Drawing Sheets

DETERMINISTIC PSEUDO-RANDOM FAULT EVENT RECORDATION AND INJECTION TOOL

BACKGROUND OF THE INVENTION

Quality assurance in software programs is increasingly critical, as industries have begun to rely more and more on computer systems to perform standard business operations. Software testing is often used and relied on to assess software quality and develop robust software. Tests may be performed at software build time to check code syntax, code style, error handling, and the like. Tests may also be performed at run time to check code performance, run-time error handling, and scalability.

Fault injection is a common method for run time software testing. Pseudo-random fault generation techniques may be used in software testing to improve coverage of a test by introducing fault events to test code paths that might otherwise rarely be followed.

SUMMARY OF THE INVENTION

Embodiments of the invention have been developed to provide tools for deterministically recording and injecting pseudo-random fault events into a computer program during execution.

Some embodiments of the invention include a method for recording a fault event during execution of a computer program. The method may include detecting a method call event during execution of the program and incrementing a counter to produce a counter value. The method may further include determining, based on a program execution state, a fault event to be generated. The fault event may be associated with a fault event type. The fault event type and the associated counter value may be stored, and the fault event may be generated.

In some embodiments, the method may further include detecting a second method call event during execution of the program and incrementing a second counter to produce a second counter value. A previously-generated fault event associated with a counter value matching the second counter value may be identified, and the previously-generated fault event may be generated.

A corresponding apparatus and computer program product for implementing the above-stated method are also disclosed and claimed herein.

BRIEF DESCRIPTION OF THE DRAWINGS

In order that the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

It will be readily understood that the components of embodiments of the present invention, as generally described and illustrated in the Figures herein, may be arranged and designed in a wide variety of different configurations. Thus, the following more detailed description of the embodiments of the present invention, as represented in the Figures, is not intended to limit the scope of the disclosure, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that embodiments of the invention can be practiced without one or more of the specific details, or with other methods, components, etc. In other instances, well-known structures, or operations are not shown or described in detail to avoid obscuring aspects of the disclosure.

The illustrated embodiments of the invention will be best understood by reference to the drawings, wherein like parts are designated by like numerals throughout. The following description is intended only by way of example, and simply illustrates certain selected embodiments of the invention that are consistent with the disclosure as claimed herein.

Figure 1:
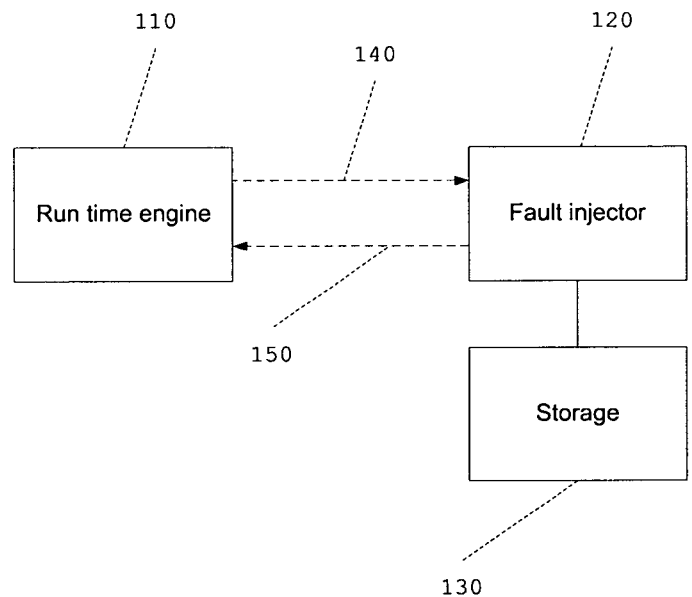
FIG. 1 shows an environment in which the present invention may be implemented.

Referring now to FIG. 1, an environment in which embodiments of the present invention may be implemented may include a run time engine 110, a fault injector 120, and a permanent storage component 130. In certain embodiments, the run time engine 110 may generate various events 140 that can be detected by the fault injector 120. The fault injector 120 may send control signals 150 to the run time engine 110 to alter the execution of a particular program.

In one embodiment, the run time engine 110 may control the execution of a computer program. It may raise various events 140 based on the state or the activity of the program it is executing. These events may be detected and interpreted by the fault injector 120. The fault injector 120 may then alter the execution of the program by sending control signals or interrupts 150 to the run time engine 110. The run time engine 110 may provide a specific interface to allow tools, such as the fault injector 120, to access the state of applications it is executing, and to modify the code of the application itself. The fault injector 120 may further access a storage component 130 to store information that may be needed later on.

Repeated execution of a program may occur while debugging a program. In some cases, however, a bug that appeared in one execution of the program may not reappear in another execution of the same program due to non-determinism. Test tools may be used to stimulate the program in more effective ways. In particular, fault injection tools 120 may inject faults into an application while it is running by relying on interfaces provided by a run time engine 110. Fault injection tools 120 may operate in a pseudo-random manner so that the types of faults injected, the position in the code where they are generated, and the moment when they are injected depend on pseudo-random parameters that cause a non-deterministic generation of those faults.

Programs, in their executable form, may be directly executed by the processor, as in the case of assembly language, C or C++, or interpreted by a virtual machine. The run time engine 110 may be adapted to the language in which the programs to test or debug are written.

The fault injector 120 may include other debugging and testing functionalities, such as profiling (ie., performance testing) or unit testing.

Figure 2:
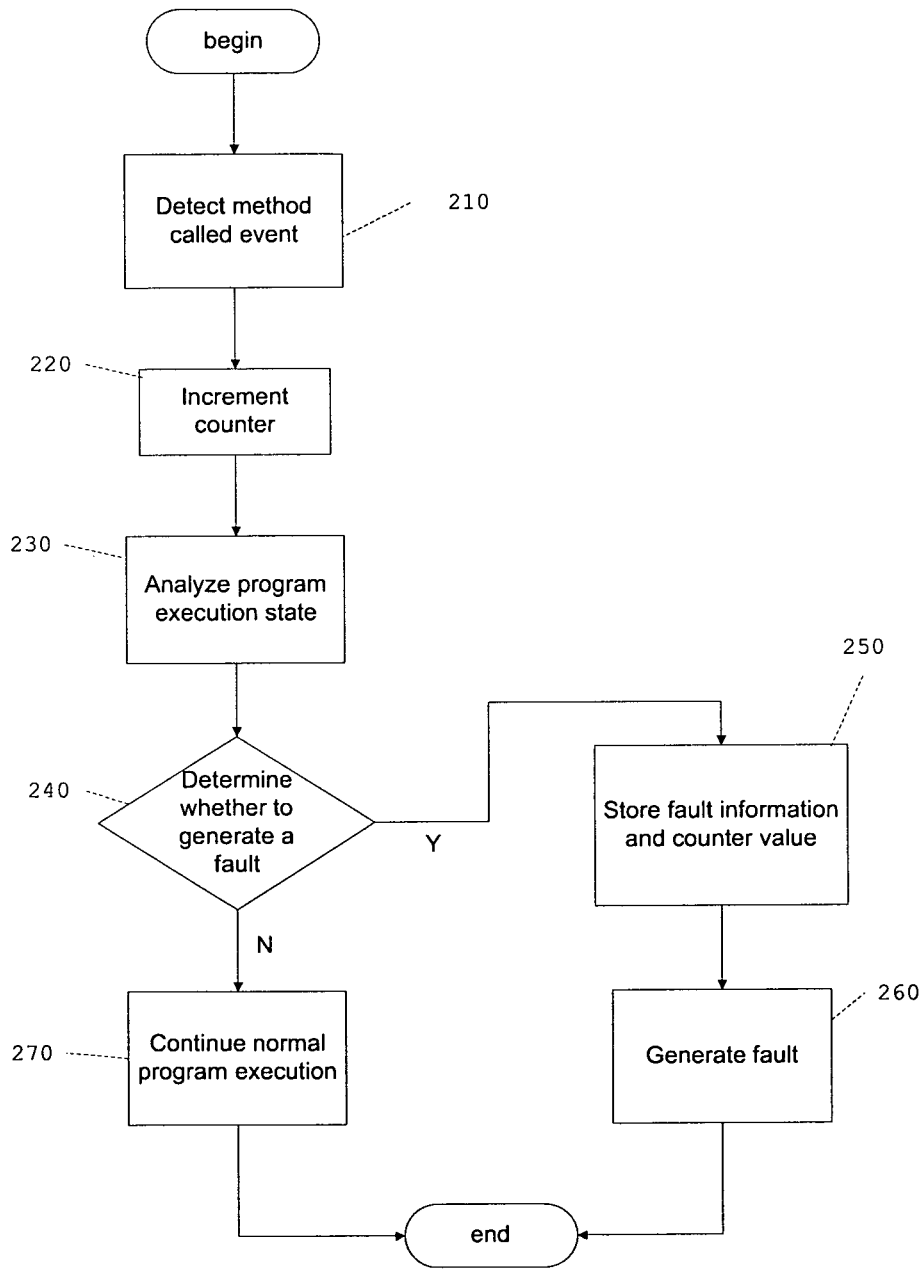
FIG. 2 shows a high-level process for recording a fault event during execution of a program in accordance with one embodiment of the present invention.

Referring now to FIG. 2, a process for recording a fault event during the execution of a program in one embodiment of the present invention may include detecting 210 a method call event, incrementing 220 a counter, analyzing 230 the state of the program execution, and determining 240 whether to generate a fault 240. If a fault is not to be generated, the program may execute 270 as usual. If a fault is to be generated, the fault information and counter value may be stored 250, and the fault may be generated 260.

In some embodiments, the fault generation mechanism may not require modification of the program source code or the run time engine 110.

A method in accordance with certain embodiments of the present invention may thus record information about the fault being generated and the location in the code where the fault is generated. During execution of the subject application, a call to an instrumented method may be performed inside the application. The injector may then be contacted 210 in order to establish if a fault should be generated in this context. The injector may increment a counter that stores the number of times it has been called 220. The injector may decide, based on the current context and the program configuration, whether a fault should be generated 240. Prior to generating a fault, the injector may record fault information, such as the type of fault and the current value of the counter that specifies the number of times the injector has been called 250. The record of this information may be stored, for instance, on the local file system or in a database. The injector may then generate 260 the fault. Otherwise, the original code of the instrumented method maybe executed 270. These steps may be repeated each time an instrumented method is called, until the program under test finishes execution.

Figure 3:
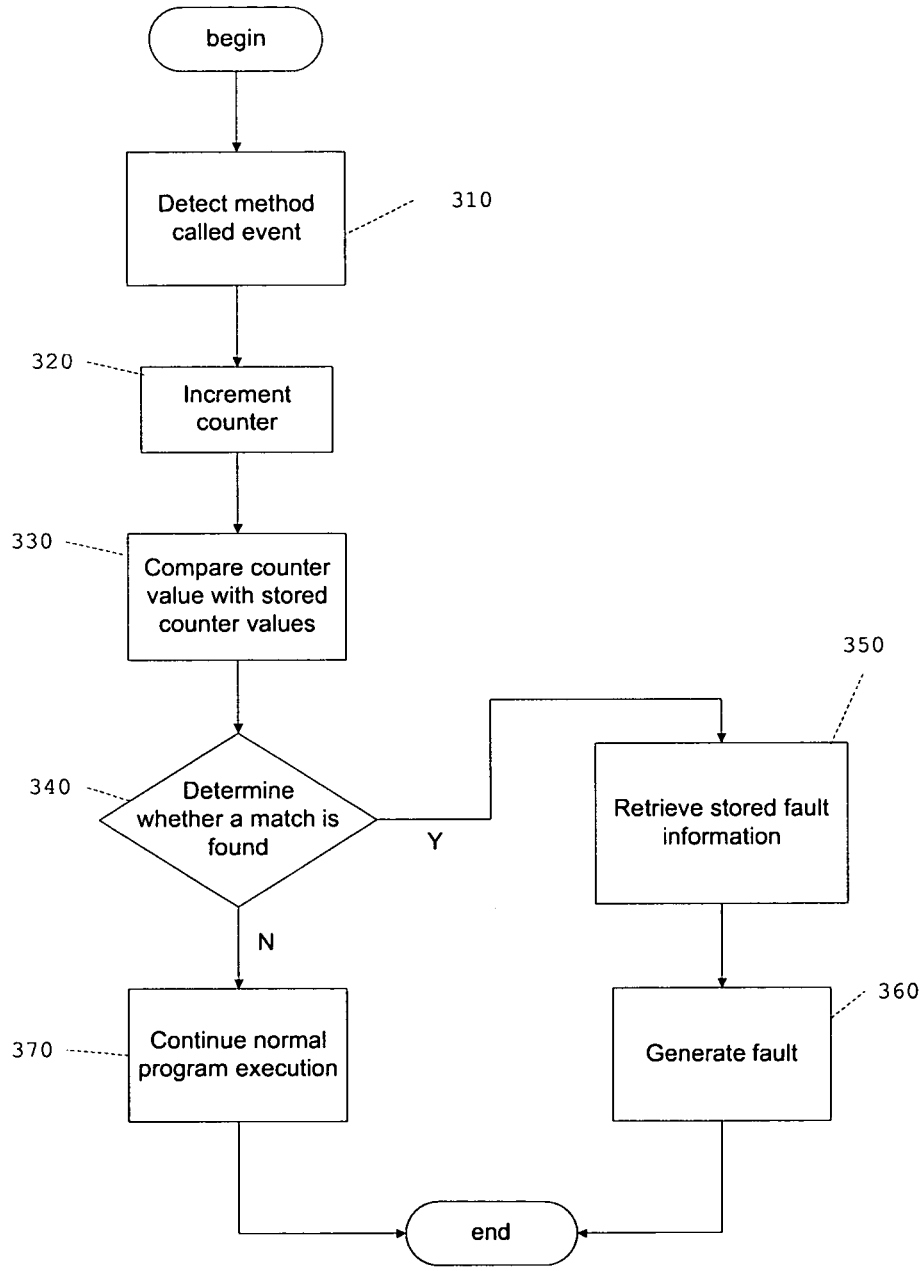
FIG. 3 shows a high-level process for injecting a fault event during execution of a program in accordance with certain embodiments of the present invention.

Referring now to FIG. 3, a process for injecting a fault event during execution of a program in one embodiment of the present invention may include detecting 310 a method call event, incrementing 320 a counter, comparing 330 the counter value with stored counter value, and determining 340 whether a match is found. If no match is found, the program may continue 370 with normal program execution. If a match is found, the stored fault information may be retrieved 350, and the retrieved fault may be generated 360.

In some embodiments, replaying may be achieved by first capturing the fault generation event schedules and information during one execution of the program, record mode, as described with respect to FIG. 3, and then enforcing the same exact schedule and faults when replaying the execution. During the replay mode, at the start of the application the injector may reload from the file system the log containing information about the generated faults in the previous execution of the application. When a call to an instrumented method is performed inside the application, the injector may be contacted to establish if a fault should be generated in this context 310. The injector may increment 320 the counter that stores the number of times it has been called. The injector may compare 330 the current counter value to the next counter value related to the generation of a fault. If they are the same, then a fault should be generated and fault information may be retrieved 350 from the recorded log. The injector may generate 360 the fault according to the recorded configuration. Otherwise, the original code of the instrumented method may be executed 370. These steps, except for the first step, may be repeated each time an instrumented method is called until the program under test ends its execution.

Figure 4:
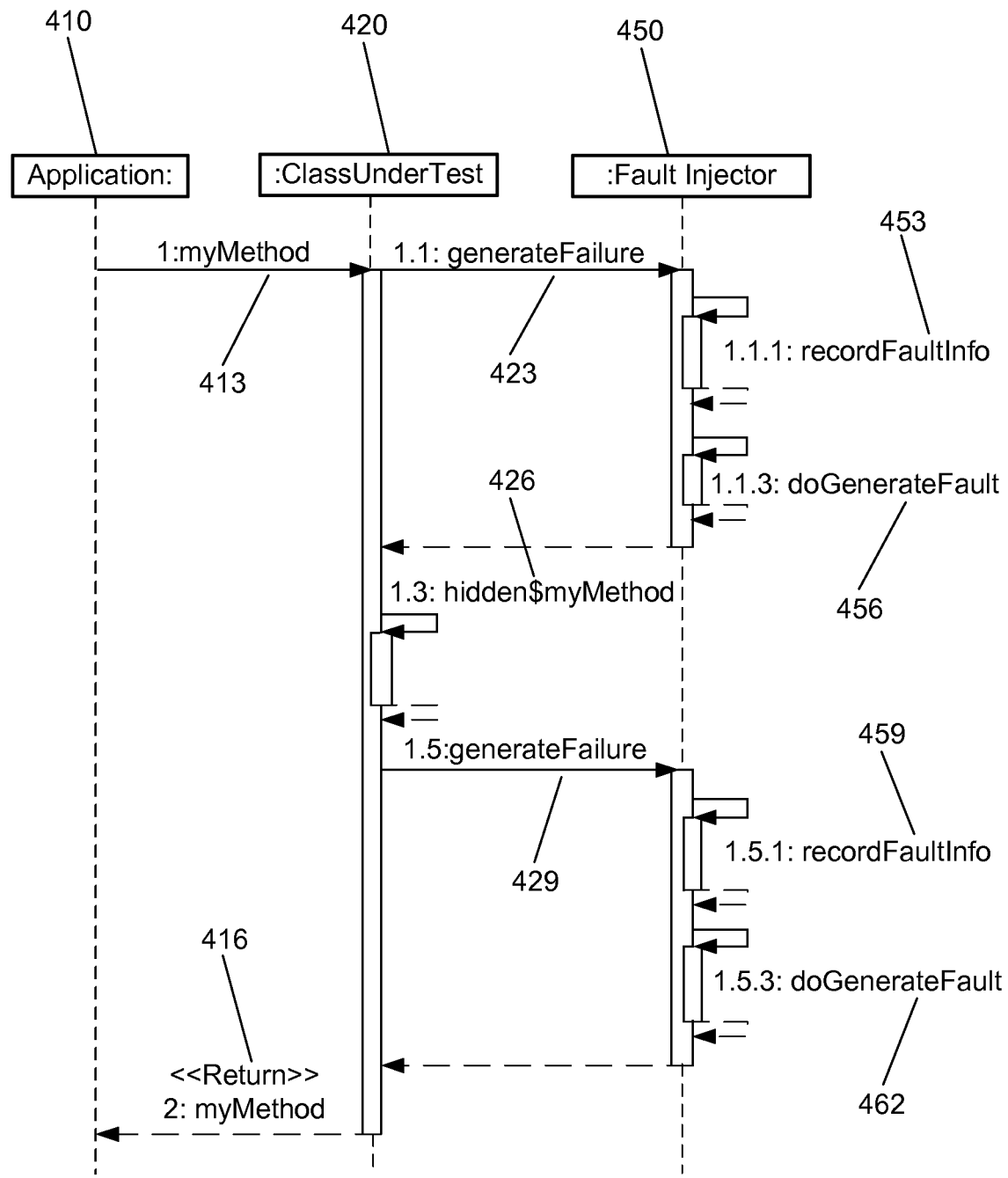
FIG. 4 shows interactions between a computer program and an embodiment of the present invention to record a fault event.

Referring now to FIG. 4, a computer program and an embodiment of the present invention may interact to record a fault event. Such interactions may involve an application 410 including a method ("myMethod") 413, 416, a class 420 to be tested, and a fault injector 450. During execution of the class 420, events 423, 429 to request the generation of a fault may be generated by the run time engine 110. The class 420 may continue execution 426 of the method to be tested.

The fault injector 450, such as that described with respect to FIG. 1 may, based on the context information, store 453, 459 the fault information and generate 456,462 a fault if needed.

During execution of the method 413, several requests 423, 429 for fault generation may be detected by the fault injector 450. Each method call may be either synchronous or asynchronous. In some embodiments, the method may execute in a single threaded application, although embodiments of the invention may easily be extended to multi-threaded applications.

Figure 5:
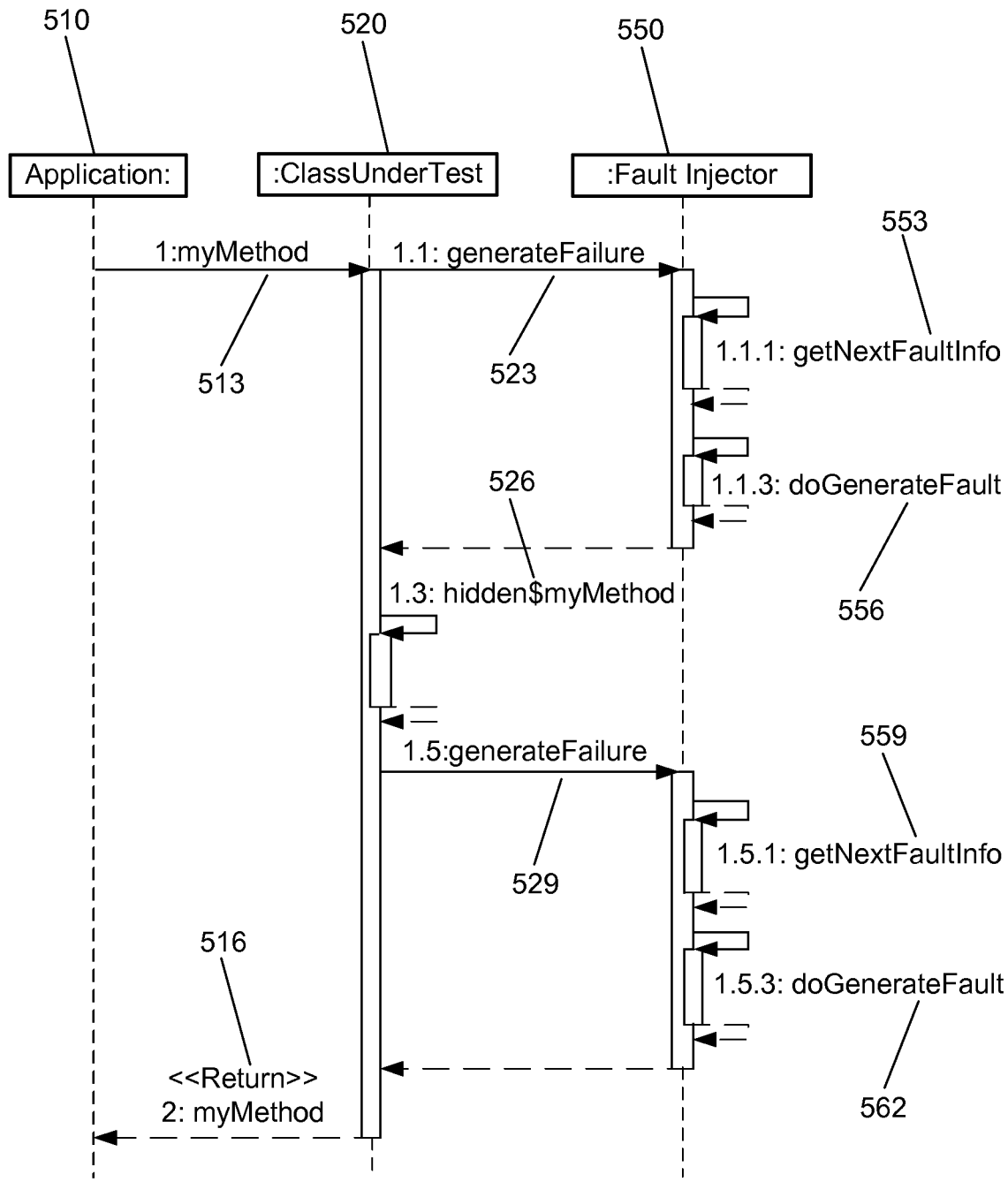
FIG. 5 shows interactions between a computer program and an embodiment of the present invention to inject a fault event.

Referring now to FIG. 5, a computer program and an embodiment of the present invention may interact to inject a fault event. Such interactions may include an application 510 comprising a method ("myMethod") 513, 516, a class 520 to be tested, and a fault injector 550. During execution of the class 520, events 523, 529 to request the generation of a fault may be generated by the run time engine 110. The class 520 may continue execution 526 of the method to be tested.

The fault injector 550, such as that described above with respect to FIG. 1 may, based on the context information, retrieve 553, 559 the fault information previously stored and generate 556, 562 a fault. As a result, the same fault may be generated at the same location in the method as previously recorded.

In another embodiment of a method for deterministically injecting a pseudo-random fault into a program during its execution, a counter value and a fault to be injected in a computer program may be recorded, and the fault may be injected when the counter value is reached.

Embodiments of the invention may take the form of an entirely hardware embodiment, an entirely software embodiment or an embodiment containing both hardware and software elements. In one embodiment, the invention may be implemented in software, including firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code may be retrieved from bulk storage during execution.

Input/output or I/O devices (including but not limited to keyboards, displays, pointing devices, and the like) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for recording and injecting a fault event during execution of a computer program, the method comprising:
    performing the following a record mode:
        detecting a first method call event during a first execution of a program;
        calling a fault injector in response to detecting the first method call event;
        incrementing a first counter value in response to calling the fault injector;
        determining, based on a program execution state, a fault event to be generated and injected into the program in response to detecting the first method call event, wherein the fault event is associated with a fault event type;
        storing the fault event type and first counter value associated with the fault event;
        generating and injecting the fault event;
    performing the following during a replay mode:
        detecting a second method call event during a second execution of the program;
        incrementing a second counter value; and
        generating and injecting the previously generated and injected fault event in response to determining that the second counter value matches the first counter value.

2. The method of claim 1, wherein the fault event is pseudo-random.

3. The method of claim 1, further comprising analyzing the program execution state in response to detecting the first method call event.

4. The method of claim 3, wherein the program execution state is analyzed by a run time engine.

5. The method of claim 1, further comprising determining whether the fault event should be generated and injected into the program.

6. The method of claim 1, wherein the program comprises a flag indicating an instruction at which the fault event should be generated.

7. The method of claim 1, further comprising retrieving the fault event type and the counter value of the previously generated and injected fault event.

8. An apparatus for recording and injecting a fault event during execution of a computer program, the apparatus comprising:
    a plurality of components implemented in at least one of hardware and a combination of hardware and software, the plurality of components comprising:
        a fault injector to, during a record mode, respond to a first method call event detected during a first execution of a program, increment a first counter value upon responding to the first method call event, and determine, based on a program execution state, a fault event to be generated and injected into the program in response to detection of the first method call event, wherein the fault event is associated with a fault event type;
        a storage component to, during the record mode, store the fault event type and first counter value associated with the fault event;
        a run time engine to, during the record mode, generate and inject the fault event;
        the fault injector further configured to, during a replay mode, detect a second method call event during a second execution of the program, increment a second counter value, and identify the previously generated and injected fault event upon determining that the second counter value matches the first counter value; and
        the run time engine further configured to, during the replay mode, generate and inject the previously generated and injected fault event.

9. The apparatus of claim 8, wherein the fault event is pseudo-random.

10. The apparatus of claim 8, wherein the run time engine further analyzes the program execution state in response to detecting the first method call event.

11. The apparatus of claim 8, wherein the fault injector further determines whether the fault event should be generated and injected.

12. The apparatus of claim 8, wherein the program comprises a flag indicating an instruction at which the fault event should be generated and injected.

13. A computer program product for recording and injecting a fault event during execution of a computer program, the computer program product comprising:
    a non-transitory computer-readable storage medium having computer-usable program code stored therein, the computer-usable program code comprising:
        computer-usable program code for performing the following during a record mode:
            detecting a first method call event during a first execution of a program;
            calling a fault injector in response to detecting the first method call event;
            incrementing a first counter value in response to calling the fault injector;
            determining, based on a program execution state, a fault event to be generated and injected in response to detecting the first method call event, wherein the fault event is associated with a fault event type;
            storing the fault event type and first counter value associated with the fault event;
            generating and injecting the fault event;
        computer-usable program code for performing the following during a replay mode:
            detecting a second method call event during a second execution of the program;
            incrementing a second counter value; and generating and injecting the previously generated and injected fault event in response to determining that the second counter value matches the first counter value.

14. The computer program product of claim 13, wherein the fault event is pseudo-random.

15. The computer program product of claim 13, further comprising computer-usable program code for analyzing the program execution state in response to detecting the first method call event.

16. The computer program product of claim 13, further comprising computer-usable program code for determining whether the fault event should be generated and injected.

\* \* \* \* \*